United States Patent [19]

Shearon et al.

[11] Patent Number: 4,685,214
[45] Date of Patent: Aug. 11, 1987

[54] PROTECTIVE GUARD UNIT FOR METAL WORKING TOOL

[75] Inventors: Charles W. Shearon; Edward N. Berticevich, both of San Jose; Ronald J. Billett, Sunnyvale, all of Calif.

[73] Assignee: FMC Corporation, Chicago, Ill.

[21] Appl. No.: 784,132

[22] Filed: Oct. 4, 1985

[51] Int. Cl.⁴ .............................................. B23D 45/00
[52] U.S. Cl. ..................................... 30/391; 125/13 R
[58] Field of Search ................... 30/390, 391; 51/269; 83/478; 125/13 R; 144/239, 251 R, 251 B

[56] References Cited

U.S. PATENT DOCUMENTS 1,270,430  6/1918  Martin ...................................... 30/391
2,737,985  3/1956  Utz ............................................ 30/391

*Primary Examiner*—Douglas D. Watts
*Attorney, Agent, or Firm*—A. J. Moore; H. M. Stanley; R. B. Megley

[57] ABSTRACT

A hand held cutting tool is disclosed for use in cutting articles, especially when the tool is to be used in confined quarters while protecting the operator from being cut by the tool. The tool includes a motor which drives the cutter only when one hand of the operator grasps the motor housing and closes a trigger. Portions of a cutter and cutter guard project out of a small housing, and the guard normally encompasses the projecting portion of the cutter. When it is desired to expose the projecting portion of the cutter to perform a cutting operation, the other hand of the operator must grip a portion of the tool remote from the exposed portion of the cutter and must actuate a valve or handle to expose and maintain the guard in the exposed cutting position.

17 Claims, 13 Drawing Figures

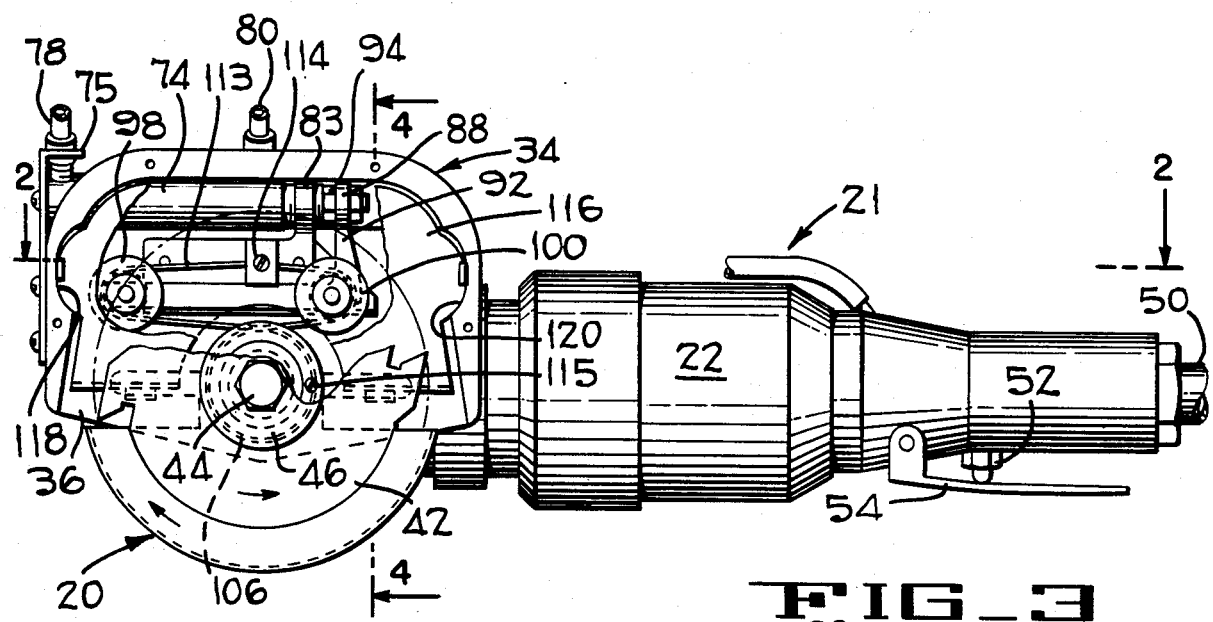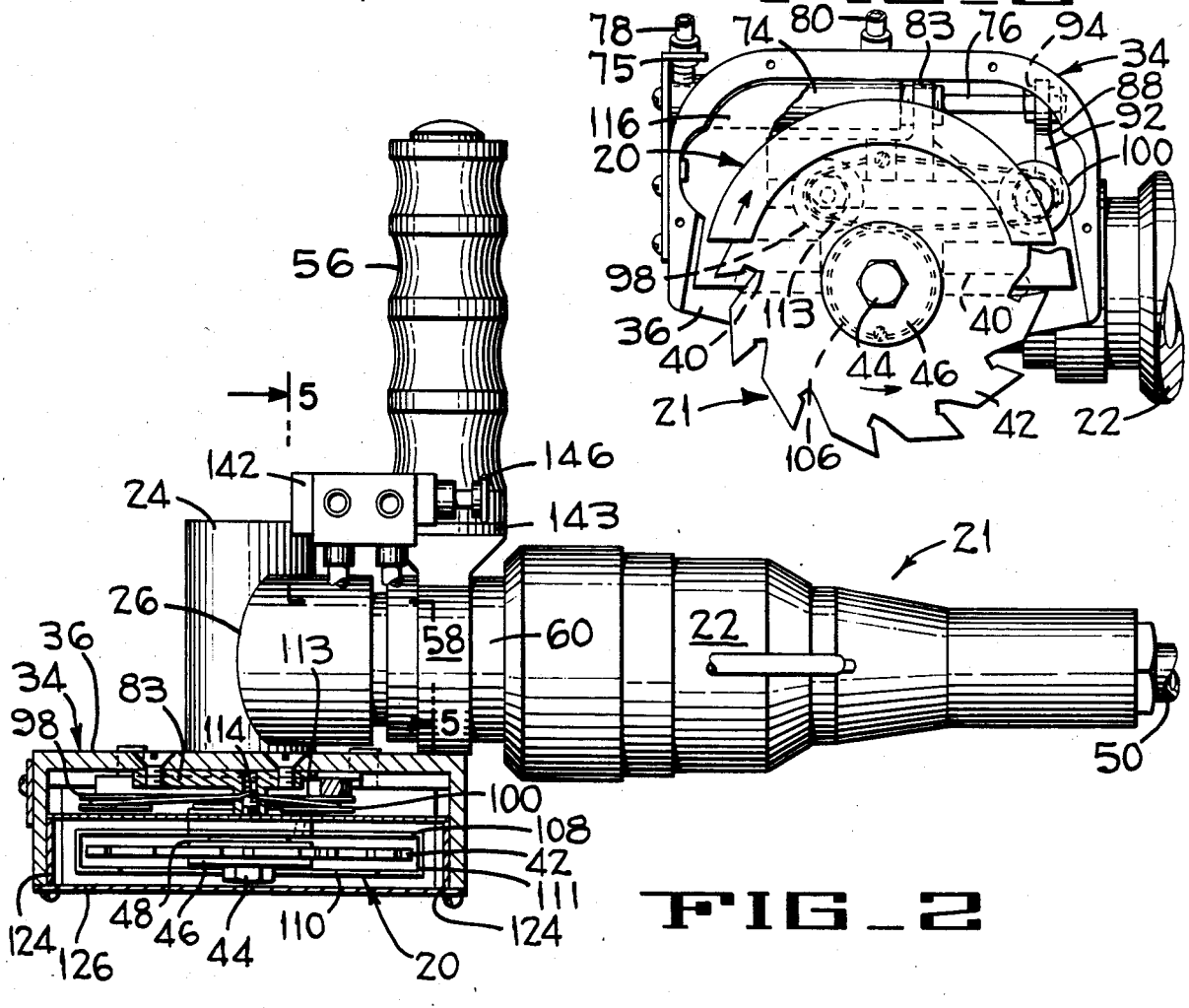

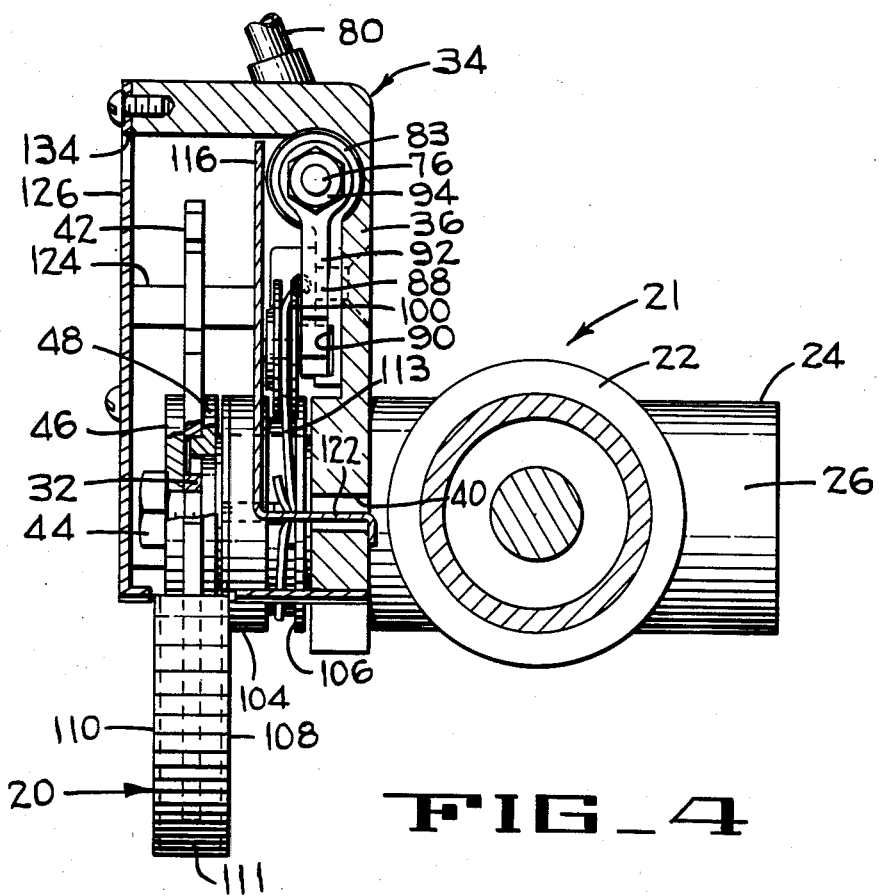
FIG_4
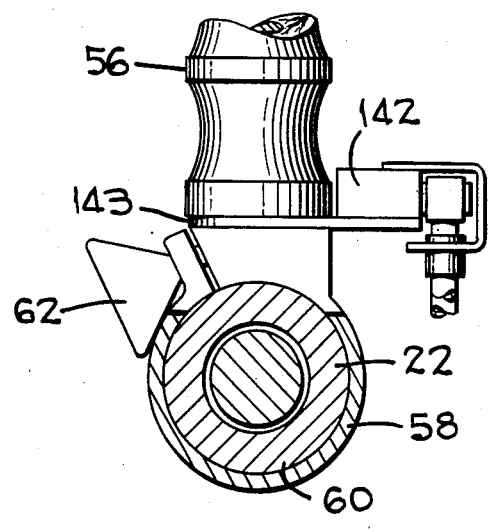
FIG_5

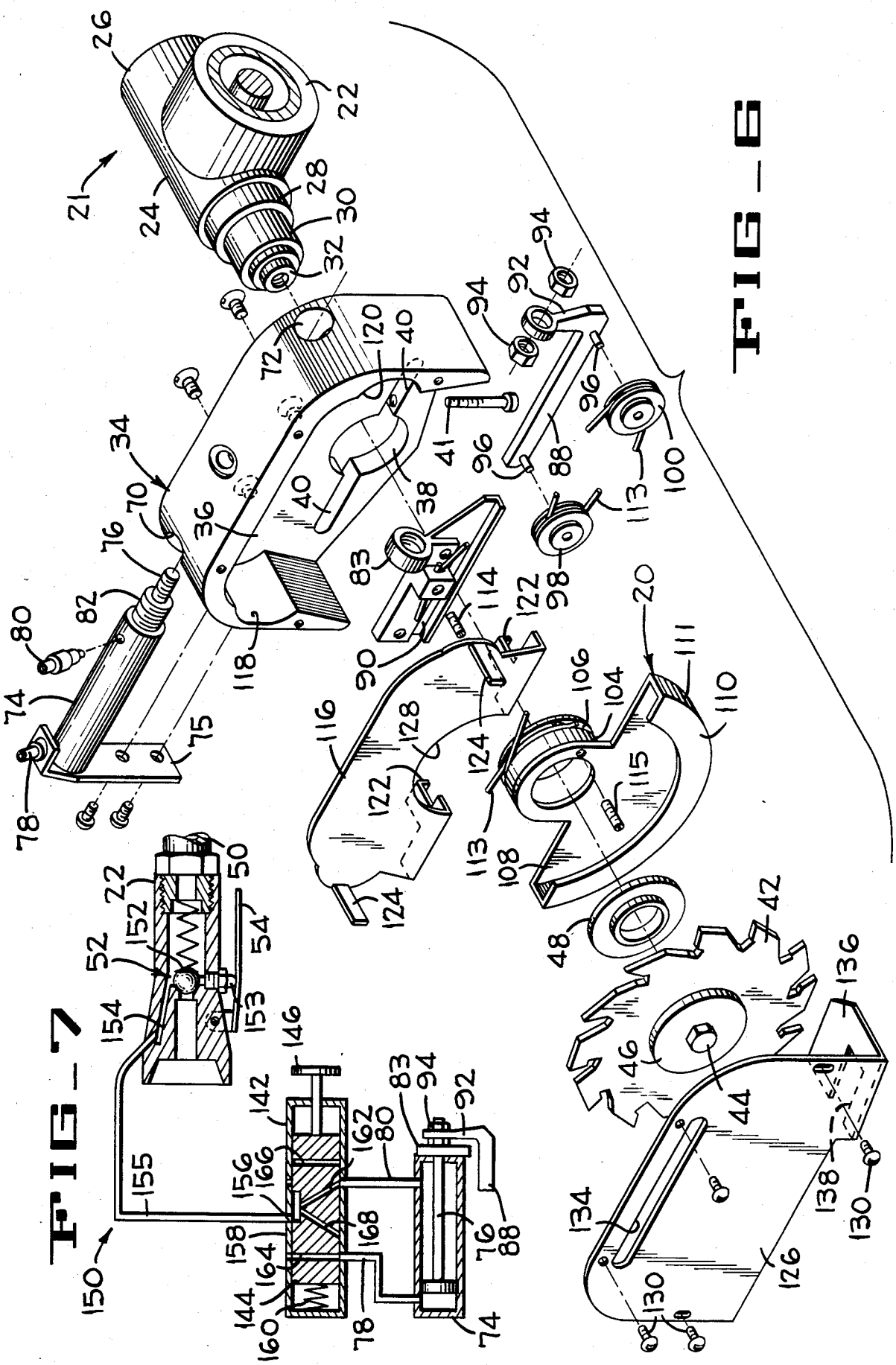

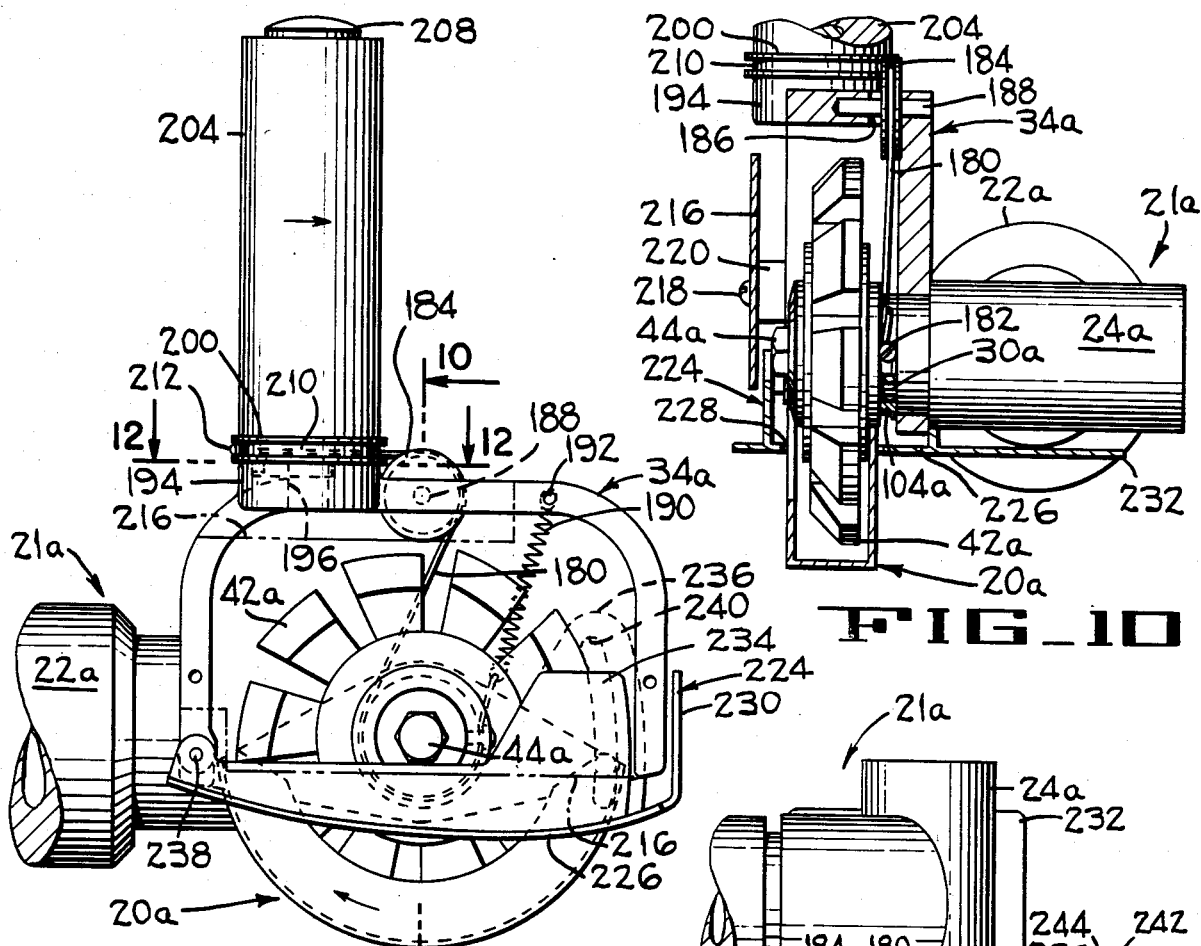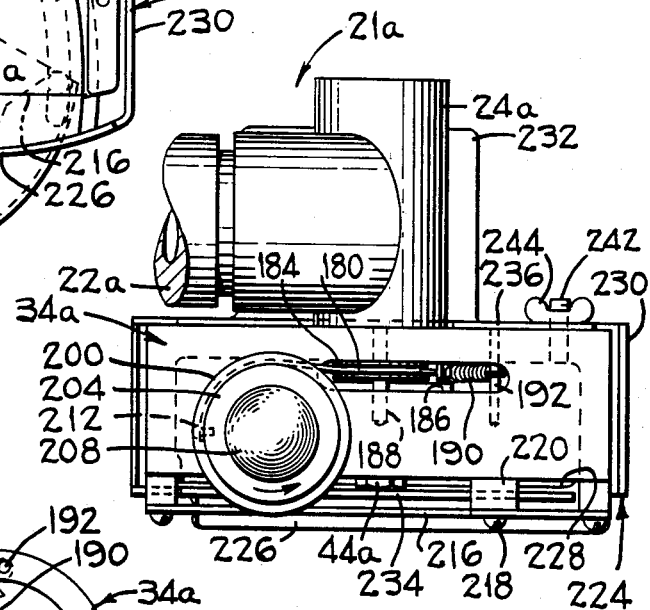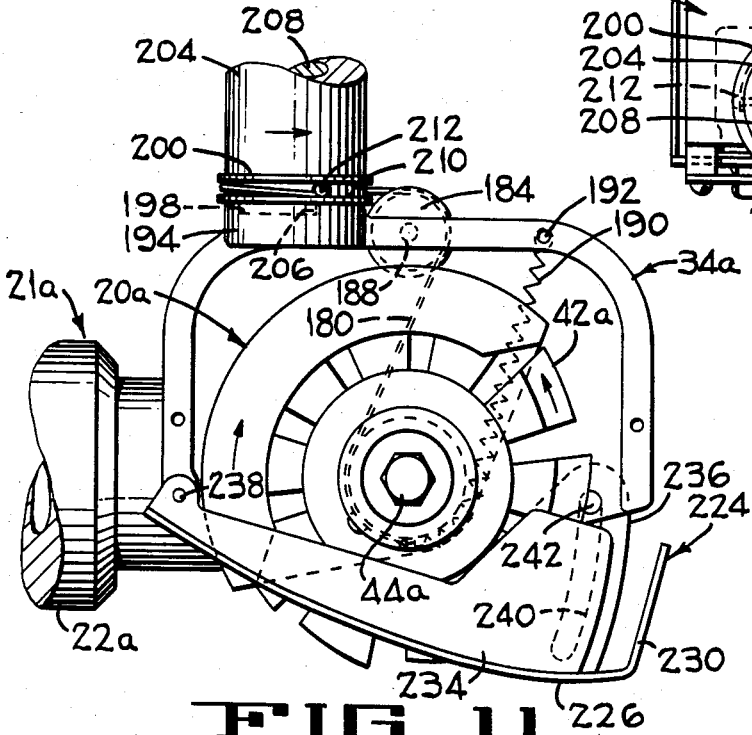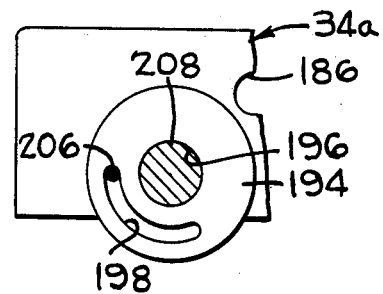

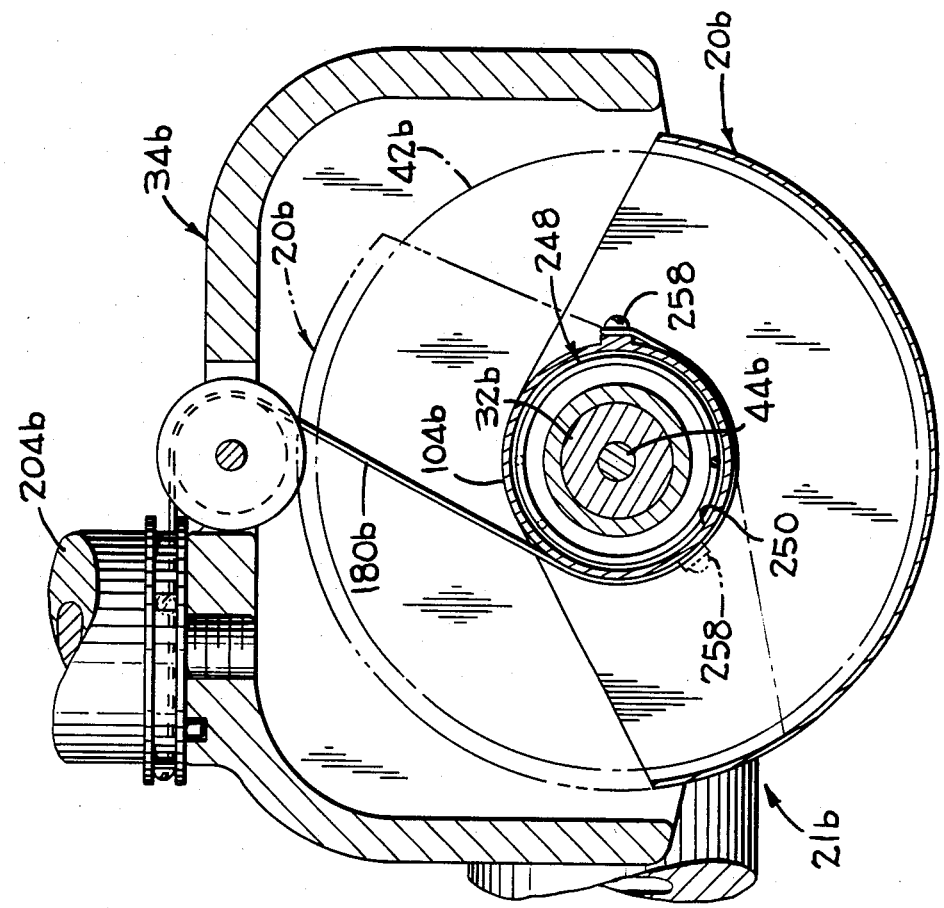
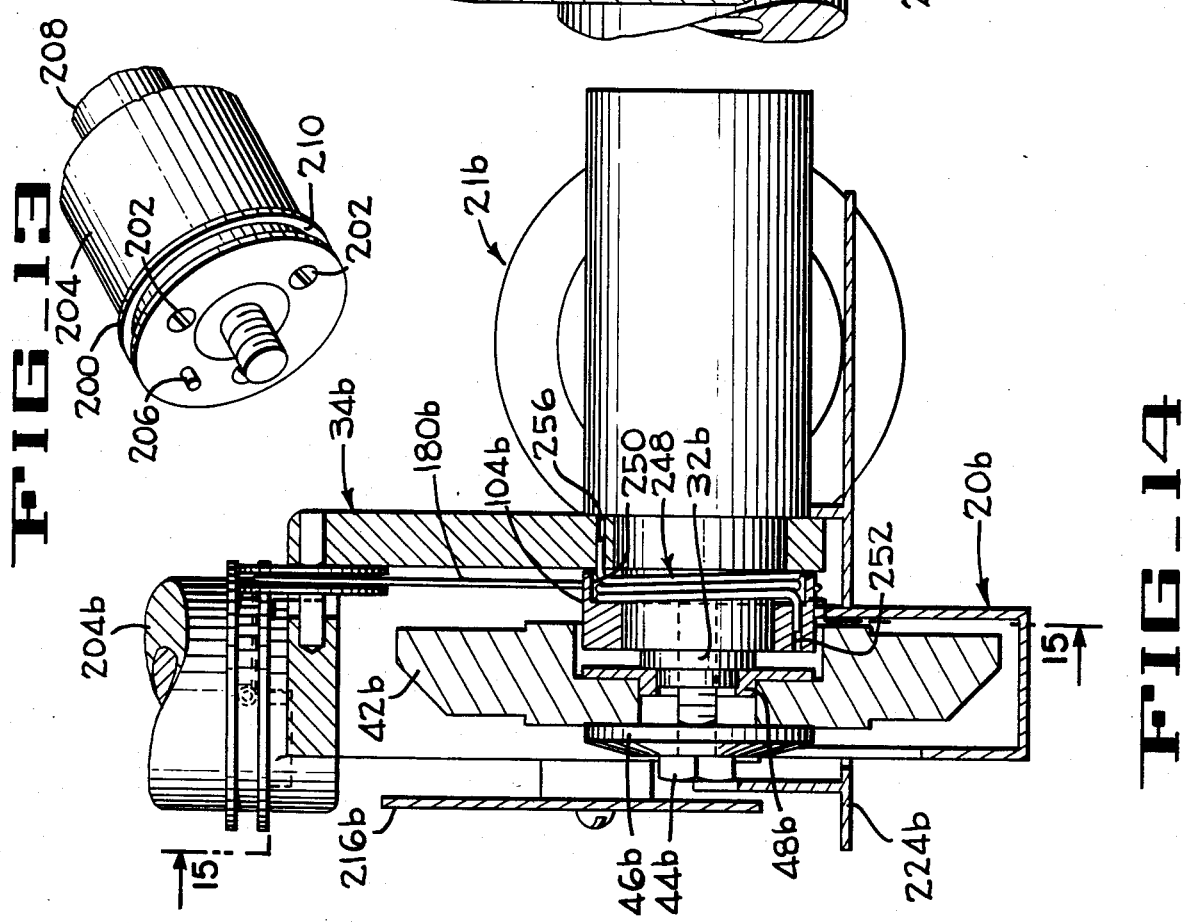

PROTECTIVE GUARD UNIT FOR METAL WORKING TOOL

BACKGROUND OF THE INVENTION

1. Field of the Invention

The present invention pertains to hand held metal working tools, and more particularly relates to a protective cutter guard unit for such tools which drive rotary saws, grinders, and other types of rotary cutters, and are capable of working in confined areas.

2. Description of the Prior Art

Hand held, rotary cutting tools with conventional saws, grinders and other types of rotary cutters protected by conventional spring loaded guards are well known in the art. However, it has been found that it is extremely difficult, when operating in a confined space, to open the guard with the work piece. Thus the operators sometimes resort to the dangerous practice of opening the guard by hand, or even removing the moving part of the guard altogether.

When used on such military vehicles, the operator must wear a protective hood similar to a welder's hood but with clear glass, and the operator also wears protective clothing to protect him from flying chips and other debris. When used for removing flanges, tabs and rough surfaces from aluminum bodies, a saw-type blade is preferably used; when used to provide linear cuts, welding grooves or large holes or the like out of aluminum bodies up to 2 inches thick, a sprocket or milling cutter are preferably used and provide accurate and smooth cuts on the aluminum. Both types of cutters are used to smooth rough spots on metal or non-metallic articles.

SUMMARY OF THE INVENTION

The present invention includes a conventional hand held power source, preferably a pneumatic motor having a body and a right angle drive, to which a rotary cutter is secured. A generally U-shaped housing is adjustably attached to the body with an exposed cutter projecting outwardly of the housing. The inventive feature includes a rotary guard unit which normally covers the exposed portion of the cutter but may be retracted out of the cutter guarding position only if the operator has both hands gripping portions of the metal working tool, and thus out of the path of the exposed cutter when being driven. In order to drive the motor, one hand must be held on a trigger which supplies power to drive the motor, while the other hand must be on or near a handle for opening an air valve which moves the guard to its cutter exposing position in accordance with the first embodiment of the invention; or must be on and twisting a rotary handle with the other embodiments of the invention, which handle and guard are spring loaded into the cutter protecting position.

BRIEF DESCRIPTION OF THE DRAWINGS

FIG. 1 is a side elevation of the protective guard unit of a first embodiment of the invention shown with the outer cover removed and attached to a pneumatic powered motor.

FIG. 2 is a section taken along lines 2—2 of FIG. 1.

FIG. 3 is an operational view in side elevation illustrating the guard in a retracted position fully exposing the cutter.

FIG. 4 is a section taken along lines 4—4 of FIG. 1 illustrating certain internal components for pivoting the guard between its retracted and protective positions.

FIG. 5 is a section taken along lines 5—5 of FIG. 2 illustrating clamp means for permitting rotation of a handle.

FIG. 6 is an exploded perspective illustrating the several components of the first embodiment of the invention.

FIG. 7 is a pneumatic diagram illustrating the pneumatic circuit for controlling the cutter guard.

FIG. 8 is a side elevation of a second embodiment of the invention with the guard in its protective position and a handle removably attached to the housing with its longitudinal axis lying in a plane parallel to the plane of the cutter.

FIG. 9 is a plan view of FIG. 8.

FIG. 10 is a section taken along lines 10—10 of FIG. 8.

FIG. 11 is an operational view similar to FIG. 8 but with the cutter guard in an open position and a cutting depth gauge in a lowered position.

FIG. 12 is a section taken along lines 12—12 of FIG. 8 illustrating a handle supporting pad of the housing and having a handle angle-limiting slot therein.

FIG. 13 is a perspective of the lower portion of the handle.

FIG. 14 is a central section through the cutter of a third embodiment of the invention which is similar to that of the second embodiment, certain parts being removed.

FIG. 15 is a section taken along lines 15—15 of FIG. 14.

DESCRIPTION OF THE PREFERRED EMBODIMENT

The protective cutter guard 20 (FIGS. 1-6) of the metal working tool 21 of the first embodiment of the invention is mounted on a conventional motor 22 having a right angle gear box 24 thereon. The gear box 24 includes a T-shaped housing 26 (FIG. 6), a large diameter tubular portion 28 and a small diameter tubular portion 30 through which a stepped drive shaft 32 extends. A generally U-shaped open front housing 34 includes a rear wall 36 having a circular bore 38 therein which communicates with a pair of slots 40. The bore 38 is rotatably received on the large diameter tubular portion 28 and is locked in desired angular position thereon by a screw 41 which passes through the slot and clamps the rear wall 36 into frictional engagement with the tubular portion 28. As shown in FIGS. 1-4 and 6, a saw type cutter 42 is secured to the drive shaft 32 by capscrew 44, a washer 46 and a stepped washer or pilot 48 which centers the cutter 42 and frictionally connects the cutter to the step shaft 32. It will be understood, however, that other types of cutters may be secured to the shaft 32.

The illustrated motor 22 is a pneumatic motor which receives high pressure air from conduit 50 (Figs. 1, 2 and 7) and includes an air valve 52 which is opened to direct air through the motor to drive the cutter in response to gripping and squeezing a trigger 54 against the motor housing. As will be described hereinafter, air is also made available to other components to be described hereinafter. As best shown in FIGS. 2 and 5, a removable handle 56 is screwed into a split ring bracket 58 which is locked in desired position on a circular portion 60 of the motor by a thumb screw 62.

As thus far described, the above components are conventional in the art.

The first embodiment of the cutter guard unit 20 (FIGS. 1-6) includes the housing 34 which is provided with two holes 70,72 (FIG. 6) to accommodate an air cylinder 74 that is secured to a bracket 75 that is connected to the housing 34 by screws. The air cylinder 74 has a piston rod 76 therein that is extended by high pressure air directed into the cylinder 74 through hose 78 and is vented to atmosphere through hose 80 as will be described in more detail later. A threaded portion 82 of an end of the cylinder 74 is screwed into a cable attachment mechanism 83 which is rigidly secured to the housing wall 36 by screws. A slider 88 is slidably received in a slot 90 formed on the cable attachment mechanism 83 and has an upstanding portion 92 that receives the piston rod 76 and is secured in adjusted position thereon by nuts 94. A pair of stub shafts 96 project outwardly from the slider 88 and rotatably receive a pair of sheaves 98,100.

The protective cutter guard 20 includes a hub 104 (FIG. 6) having a cable groove 106 therein. An inner wall 108 is rigid with the hub and has an arcuate flange 110 and an end wall 111 that cooperates to enclose the cutter when the cutter is in its protective position. The hub is rotatably received on the tubular portion 30. As best shown in FIGS. 1 and 3, a cable 113 is trained around the sheaves 98,100; and around the cable groove 106. The cable 113 is locked to the cable attachment mechanism 83 by set screw 114 and to the cutter guard 102 by set screw 115.

In order to minimize the number of parts required on the metal working tool 21 and to prevent pieces or cuttings of metal from interferring with the cable 113, an inside cover 116 is provided to hold sheaves 98,100 on their stub shafts 96, and to maintain the slider 88 in place. Arcuate cut-outs 118,120 are formed in the housing 34 which slidably receive the inside cover 116 in a relatively tight fit within the housing thus minimizing cuttings that enter the cable chamber. The cover 116 includes forwardly directed angle members 122 which are received in overlapping engagement in the housing slots 40, and rearwardly directing legs 124 which abut an outer cover 126 (FIG. 4) when in operative position. An arcuate opening 128 (FIG. 6) is formed in the inside cover 116 and closely encompasses the upper portion of the hub 104.

The outside cover 126 is secured to the housing by screws 130, and includes an upper slot 134 which allows metal cuttings to exit the housing, and through which a tool or bar (not shown) may be inserted to prevent the cutter 42 from rotating when being bolted onto or being removed from the shaft 32. A generally horizontal flange 136 with a slot 138 therein through which the cutter 42 rotates during operation acts as a stopper for the guard when the guard is in its cutter protecting position.

As best shown in FIGS. 2, 5 and 7, a manually operated pneumatic valve 142 is secured to a mounting plate 143 which is connected to the split ring bracket 58 by screws (not shown). Thus, the valve 142 may be rotated to different positions with the handle 56 after first loosening the thumb screw 62.

The valve 142 includes a core 144 (FIG. 7) which is manually operated by the operator when he depresses a knob 146. It will be noted that the knob 146 is located in a position that must be pushed by the operator's right thumb when the operator's right hand is gripping the handle 56 and the left hand is sqeezing the trigger 54. In the event the handle 56 must be removed to allow the metal working tool 21 to enter confined quarters, the operator grips the body of the motor 22 with his right hand and depresses the valve knob 146 with the side of his right hand or index finger.

A pneumatic circuit 150 is diagrammatically illustrated in FIG. 7. The circuit receives high pressure (HP) air from conduit 50 which flows into the motor 22 when a spring loaded ball 152 of the valve 52 is opened by plunger 153 in response to squeezing the trigger 54 against the body of the motor. A bypass passage 154 in valve 52 permits high pressure air to flow through a conduit 155 into and through a port 156 in the housing 158 of valve 142 when the core 144 is held in the illustrated position by a spring 160. The high pressure air then flows through a passage 162 in the valve core and through the conduit 80 into pneumatic cylinder 74 to hold the piston rod 76 retracted thus maintaining the cutter guard 20 in its cutter protecting position illustrated in FIG. 1. At this time the closed end of the cylinder 74 is vented to atmosphere by conduit 78 and a passage 164 in the valve core 144.

When the valve button 146 is moved to the left (FIG. 7) by the operator's hand, the valve core 144 shifts thus closing passages 162,164 and opening passages 166,168. High pressure air is then directed from conduit 155 through passage 168 thus moving the piston rod 76 to the right which retracts or opens the guard 20 exposing the cutter 42 to perform a cutting operation. At this time, the right side of the cylinder 74 is vented to atmosphere through conduits 80 and open passage 166 in the valve core 144. When the operator releases the valve button 146, the spring 160 shifts the core 144 to its illustrated position thus shifting the piston 76 to its FIG. 7 position for returning the guard 20 to its extended cutter protecting position.

A second embodiment of the protective cutter guard 20a of the present invention is illustrated in FIGS. 8–13. Components of the metal working tool 21a and cutter guard 20a which are similar to those of the first embodiment will now be described in detail but will be assigned the same numerals used in regard to the first embodiment followed by the letter "a".

The protective guard 20a includes a housing 34a mounted on the housing of motor 22a with the cutter 42a secured to the motor shaft (not shown) by a capscrew 44a all as described in the first embodiment of the invention. The hub 104a (FIG. 10) of the cutter guard 20a is received for rotation on the small diameter portion 30a of the gear box 24a.

One end portion of a cable 180 is connected to the hub 104a by a screw 182 and is trained over a sheave 184 that projects through a slot 186 in the housing 34a and is journaled on a pin 188 secured to the housing. A tension spring 190 is connected between one end of the cable 180 and a pin 192 inserted in the housing 34a to provide a guard returning force.

The housing 34a includes a pad 194 (FIGS. 8 and 12) which has a threaded hole 196 and an arcuate slot 198 therein which slot extends through an arc of about 112°.

A cable pulley 200 (FIGS. 8 and 13) is connected by screws 202 to the lower end of a tubular handle 204 and has an abutment pin 206 projecting downwardly therefrom into the slot 198 (FIG. 12) when a socket head, shouldered bolt 208 is screwed into the hole 196. The other end of the cable 180 is secured to a groove 210 in the pulley 200 by a screw 212. The spring 190, when in the position illustrated in FIG. 8, pulls the cutter guard into its extended cutter guarding position when the handle 204 is released at which time the pin 206 will engage one end of the slot 198 (FIG. 12).

In order to permit chips and metal cuttings to be freely discharged from the housing 34a and from the cutter guard 20a, a side plate 216 (FIGS. 9 and 10) is connected to the housing by screws 218 and spacers 220. A side view of the plate 216 is illustrated by phantom lines in FIG. 8.

An adjustable cutter depth control shoe 224 comprises a curved work engaging plate 226 which is provided with a slot 228 (FIG. 10) that receives the cutter 42a and the cutter protecting portion of the guard 20a. The plate 226 includes an upstanding end portion 230 and a side extension 232 disposed below the body of the motor 22. A pair of upstanding side plates 234,236 are welded to the plate 226 and have one end pivotally connected to the housing 34a by a pin 238. An arcuate slot 240 is formed in the plate 236 and movably receives a threaded stud 242 screwed into the housing 34a, which stud receives a wing nut 244 (FIG. 9) that secures the depth control shoe 224 in desired working position.

In operation of the metal working tool 21a of the second embodiment of the invention, the motor 22a is connected to a source of high pressure air and the operator grips the trigger portion of the motor body 22a (which is the same as the FIG. 1 embodiment) with one hand and grasps the handle 204 with the other hand after first setting the depth control shoe at the desired depth of cut. In order to drive the cutter 42a and permit the cutter to engage the surface to be cut, the operator must squeeze the motor trigger to rotate the cutter 42a, and must twist the spring loaded handle 204 through an arc of about 112° in order to rotate the cutter guard about 140° from the extended protective position of FIG. 8 to the retracted cutting position of FIG. 11. Thus, the operator must maintain both hands on the tool in order to cut the object being worked upon. If the operator should release the hand holding the air motor trigger, the cutter will stop rotating. If the operator should release his other hand, the spring 190 returns the guard to the cutter guarding position of FIG. 8. It will be noted that the side plate 216 and depth control shoe 224 protects the operator from inadvertently placing a finger within the housing 34a in position to be engaged and cut by the cutter 42a.

It will be noted that the longitudinal axis of the handle 204 is in alignment with the plane of the cutter 42a (FIG. 10). Thus, the operator may apply pressure with both hands to accurately guide the cutter along a linear path through the metal being cut without applying side forces on the tool which would tend to bind the cutter in the metal being cut.

The cutting tool 21a is specifically designed to cut metal along a linear path or along a curved path having a radius in excess to about 1 foot in diameter. If the metal being cut is thick, for example aluminum that is about 2 inches thick, the cutter is usually pushed into the work to establish a groove therein. A linear (or curved) tool guide (not shown) is then clamped on the work and the depth control shoe 224 is set at the desired depth of cut. Since the depth control shoe 224 has an arcuate surface rather than a planar surface, the operator first makes a shallow cutting pass in the work by angling the forward portion of the cutter 42 into the work with the forward portion of the depth control shoe 224 determining the initial depth of cut. The operator then deepens the cut by moving his hand which grips the trigger 54 toward the work thus exposing a greater depth of cutter to the work. Thus, by gradually pivoting the rear of the tool toward the work, the operator may make one or more passes and cut through thick metal pieces without readjusting the depth control shoe.

The cutter 42a is primarily used to cut through metal up to 2 inches in thickness, or to cut angled welding knotches in the edge of the metal.

FIGS. 14 and 15 illustrate a third embodiment of the protective guard 20b and metal working tool 21b which are substantially the same as the second embodiment except that a torsion spring 248 and associated parts have been substituted for the tension spring 190 of the second embodiment. Accordingly, parts of the third embodiment that are the same or similar to that of the second embodiment will not be described in detail and will be assigned the same numerals as that of the second embodiment followed by the letter "b".

The metal working tool 21b (FIGS. 14 and 15) and its protective cutter guard 20b includes the handle 204b rotatably supported on the housing 34b. The cutter 42b is connected to the stepped drive shaft 32b by the capscrew 44b, washer 46b and pilot or stepped washer 48b which centers the cutter on the shafts 32b. The side plate 216b and depth control shoe 224b are the same as that disclosed in the second embodiment of the invention.

The cutter guard 20b is slightly modified in that the hub 104b is provided with a counterbore 250 and a hole 252 to receive the body and one end, respectively, of the torsion spring 248. The other end of the torsion spring 248 is received in a hole 256 in the housing 34b. One end of the cable 180b is connected to the handle 204b as in the second embodiment of the invention, and the other end is connected to the hub 104b by a screw 258. It will be noted that the counterbore 250 protects the torsion spring 248 from being contaminated by metal cuttings and chips.

Although only two types of cutters 42 (FIG. 1) and 42a, 42b have been illustrated, it will be understood that other milling type cutters having other configurations may be used. Although the workpiece has been referred to as being aluminum, it will be understood that other materials, including other metals, may be cut by the apparatus of the present invention.

From the foregoing description it will be apparent that each of the three embodiments of the invention include cutter guards which protect the operator from injury since both of his hands must be gripping the tool when the cutter is driven and the cutter is unguarded since the cutter will stop if the hand holding the trigger is released, and since the guard will be returned to its cutter guarding position if the handle is released or if the air valve is not depressed.

Although the best mode contemplated for carrying out the present invention has been herein shown and described, it will be apparent that modification and variation may be made without departing from what is regarded to be the subject matter of the invention.

What is claimed is:

1. A protective cutter guard unit for a hand held cutting tool having a motor which includes a motor housing and a drive shaft which is driven in response to gripping the motor housing and squeezing a motor trigger with one hand, the improvement which comprises:

means defining a cutting housing secured to said motor housing;

cutter means secured to said drive shaft and being partially encompassed within said cutter housing with an exposed portion projecting out of said housing;

means defining a cutter guard mounted for rotation on said motor housing between an extended position covering said exposed portion of said cutter means and a retracted position uncovering said exposed portion of said cutter means;

control means operatively connected to said cutter guard for normally holding said cutter guard in said extended position, said control means being actuated to move said cutter guard to said retracted position only when the operator's other hand and fingers manually actuate said control means and grip a portion of said tool; and housing adjustment means for adjustably mounting said cutter housing on said motor housing in any one of a plurality of positions.

2. An apparatus according to claim 1 wherein said cutter guard means includes an annular hub mounted for rotation on said motor housing; and wherein said control means additionally comprises a cable having a first portion rigidly connected to and trained around said hub; means rigidly securing at least another portion of said cable to said cutter housing; a fluid cylinder rigidly connected to said cutter housing and having a piston rod extending within said cutter housing; a slider connected to said piston rod; a pair of sheaves journaled on said slider and having said cable trained thereover; said piston rod being normally held at one end of its stroke by fluid pressure to maintain said cutter guard in said extending cutter covering position by fluid pressure, and being moved to the other end of its stroke to move said guard to said retracted position in response to the operator's other hand and fingers manually actuating said control means and gripping a portion of said tool.

3. An apparatus according to claim 2 and additionally comprising a manually operated valve secured on said tool and normally directing high pressure fluid into said cylinder for holding said piston rod at said one end of said stroke, said valve being manually actuated to move said piston rod to the other end of said stroke in response to the operator's other hand and fingers manually actuating said valve and gripping a portion of said tool.

4. An apparatus according to claim 2 and additionally comprising inside cover means snugly fitted within said housing about a portion of said annular hub inwardly of said cutter for maintaining said slider and said sheaves in operative position and for shielding said slider, sheaves and cable from being contaminated by cuttings removed from a workpiece by said cutter.

5. An apparatus according to claim 3 wherein said motor housing includes a cylindrical portion; and additionally comprising a split ring bracket adjustably mounted on said cylindrical portion, and a handle secured to said split ring bracket; said manually operated valve being mounted on said split ring bracket in position to be actuated by the operator's thumb of his other hand when his other hand is gripping said handle.

6. An apparatus according to claim 4 wherein said housing includes a removable outside cover secured thereto and having said cutter means disposed between said inside and outside cover; and additionally comprising a flange normal to and integral with said outside cover, and means defining a slot in said flange through which said cutter moves, said slot preventing jamming said cutter by precluding large articles from being propelled between said inside and outside covers by said cutter when driven.

7. An apparatus according to claim 2 wherein said piston rod and a major portion of said cylinder are disposed within said housing.

8. An apparatus according to claim 5 wherein when said handle is removed for operating said cutting tool in confined areas, said valve being actuated by the forefinger of said other hand while said other hand is gripping said motor housing.

9. An apparatus according to claim 1 wherein said motor is an air motor.

10. An apparatus according to claim 1 wherein said cutter housing includes means defining a slot therein, wherein said cutter guard means includes a cylindrical flange, said control means additionally comprising a handle secured for rotation on said housing, a cable pulley included in said handle, a sheave journaled in said slot, a cable having end portions secured to said cylindrical flange and said cable pulley, said cable having portions trained around said cylindrical flange and said cable pulley, and spring means for normally maintaining said guard in said extended cutter protecting position, said handle being gripped by the operator's other hand and twisted through an arc against the urging of said spring means for rotating said cutter guard means to said retracted position for exposing said cutter means.

11. An apparatus according to claim 10 and additionally comprising a pin projecting from said handle toward said cutter housing, and an arcuate slot in said cutter housing for receiving said pin and limiting the amount of pivotal movement of said handle to move said cutter guard between a fully extended and a fully retracted position.

12. An apparatus according to claim 10 and additionally comprising a depth control shoe having a slot therein for receiving said cutter means, means for pivoting one end of said shoe to said housing, and means for adjustably connecting the other end of said shoe to said housing for controlling the depth of cut of said cutter means.

13. An apparatus according to claim 10 wherein said spring is a tension spring.

14. An apparatus according to claim 13 wherein said spring is a torsion spring.

15. An apparatus according to claim 12 wherein said housing means includes a side plate having an opening spaced a distance from said cutter to provide space for cuttings to be discharged from said tool, said space being insufficient to permit the fingers of an operator to be engaged by said cutter.

16. A protective cutter guard for a hand held cutting tool having an air motor which includes a motor housing and a drive shaft which is driven in response to gripping the motor housing and squeezing a motor trigger with one hand, the improvement which comprises:

a cutter housing adjustably secured to the motor housing for rotation to a plurality of selected positions;

a cutter secured to said drive shaft and being partially encompassed within said cutter housing with an exposed portion projecting out of said housing;

a cutter guard mounted for rotation on said motor housing between an extended protective position enclosing said exposed portion of said cutter and a retracted position uncovering said exposed portion;

an air cylinder and piston rod rigidly secured to said housing with a major portion disposed within said housing;

actuating means operatively connecting said cutter guard to said piston rod; and a manually operated valve secured to said tool and operatively connected to said air cylinder for normally maintaining said piston rod in a first position for maintaining said cutter guard in said extended protective position; said valve means being actuated to move said piston rod to a second position for moving said cutter guard to said retracted position only when the operator's other hand manually actuates said valve means and grips a portion of said tool.

17. An apparatus according to claim 16 wherein said tool additionally comprises;

a handle, handle supporting means adjustably connected to said handle and to said motor housing, said valve being secured to said adjustable handle support means; when said tool is to be used in confined areas, said handle being removed from said tool and said valve means being adjusted to any one of a plurality of positions for enabling the operator to use the tool in said confined areas.

* * * * *